(12) United States Patent
Takagi et al.

(10) Patent No.: US 6,940,423 B2
(45) Date of Patent: Sep. 6, 2005

(54) DEVICE FOR MONITORING AREA AROUND VEHICLE

(75) Inventors: Makoto Takagi, Toyota (JP); Toshiyasu Katsuno, Nagoya (JP); Kazushi Konno, Chita (JP); Toshiaki Kakinami, Nagoya (JP); Yoshifumi Iwata, Anjo (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 138 days.

(21) Appl. No.: 10/284,313

(22) Filed: Oct. 31, 2002

(65) Prior Publication Data

US 2003/0080877 A1 May 1, 2003

(30) Foreign Application Priority Data

Oct. 31, 2001 (JP) ...................................... 2001-335584

(51) Int. Cl.[7] ................................................ B60Q 1/48
(52) U.S. Cl. .................... 340/932.2; 340/903; 340/937; 340/436; 340/461; 340/425.5; 701/41; 701/36
(58) Field of Search .............................. 340/932.2, 937, 340/903, 436, 425.5, 461, 435; 701/41, 28, 36, 64, 23; 348/118, 148, 149, 159; 180/204, 446; 346/118, 148

(56) References Cited

U.S. PATENT DOCUMENTS 5,574,426 A * 11/1996 Shisgal et al. .............. 340/435
5,670,935 A * 9/1997 Schofield et al. ........... 340/461
5,680,123 A   10/1997 Lee
6,078,849 A * 6/2000 Brady et al. .................. 701/28
6,144,296 A   11/2000 Ishida et al.

FOREIGN PATENT DOCUMENTS

| DE | 198 16 054 A1 | 10/1998 |
| DE | 100 37 129 A1 | 4/2001 |
| DE | 101 09 680 A1 | 10/2001 |
| JP | 1-141137 | 6/1989 |
| JP | A 2000-134608 | 5/2000 |
| JP | A 2001-6097 | 1/2001 |

OTHER PUBLICATIONS

Japanese Office Action with English translation of Examiner's Comment.
European Patent Office Communication dated Dec. 23, 2003 with attached European search report.

* cited by examiner

Primary Examiner—Hung Nguyen
(74) Attorney, Agent, or Firm—Kenyon & Kenyon

(57) ABSTRACT

A back camera image from a back camera mounted on a rear portion of a vehicle body is displayed on a display mounted on the console inside the vehicle cabin when the vehicle is parallel parking. After the vehicle passes a steering direction reversal point in this state, a corner camera image from a corner camera mounted on a corner portion of a front portion of the vehicle body is displayed on the display when the vehicle nears a vehicle parked in front, or, more specifically, when an angle of the vehicle after it has reached the steering direction reversal point has reached a predetermined value. Guidance images may be overlaid upon the camera images during some or all of the parallel parking maneuver.

20 Claims, 14 Drawing Sheets

60 DISPLAY

60 DISPLAY

60 DISPLAY

DEVICE FOR MONITORING AREA AROUND VEHICLE

INCORPORATION BY REFERENCE

This disclosure of Japanese Patent Application No. 2001-335584 filed on Oct. 31, 2001 including the specification, drawing and abstract is incorporated herein by reference in its entirety.

BACKGROUND OF THE INVENTION

1. Field of the Invention

The invention relates to a device for monitoring an area around a vehicle. More specifically, this invention relates to a device for monitoring an area around a vehicle, which is preferable for monitoring an area around the vehicle when parallel parking or backing up.

2. Description of Related Art

A device for monitoring an area around a vehicle, which displays an image of an area in back of the vehicle is displayed on a monitor screen when the vehicle backs up, has been known. An example of this kind of device is disclosed in Japanese Patent Laid-Open Publication No. 1-141137. This device is provided with an obstacle detecting sensor mounted on both sides at a front portion of the vehicle. The obstacle detecting sensor detects whether the front portion of the vehicle has come near an obstacle. In this type of known device, when the obstacle detecting sensor detects that the front portion of the vehicle has come near an obstacle when backing up, information indicative of that fact lights up as a warning display on a monitor screen together with a view of the area in back of the vehicle. Therefore, according to this known device for monitoring an area around a vehicle, it is possible for the driver to check, using the monitor screen, whether or not the front portion of the vehicle is near an obstacle when backing up. As a result, it is possible to avoid a situation where the vehicle contacts an object, thereby enabling the vehicle to be backed up safely.

According to the foregoing device, however, the driver is only provided with information about whether the front portion of the vehicle has come near an obstacle. Accordingly, the driver is not provided with information pertaining to how close the vehicle actually is to the obstacle when the driver starts to back the vehicle up. As a result, the driver is unable to know how close the vehicle is to the obstacle. Regarding this, the known device leaves the driver with the concern that the vehicle might contact the obstacle, and does not provide the driver with helpful information for backing the vehicle up safely.

SUMMARY OF THE INVENTION

In view of the foregoing problem, it is an object of the invention to provide a device for monitoring an area around a vehicle in which helpful information can be provided to the driver when backing up, without requiring an operation by the driver.

According to an embodiment of the invention, a device for monitoring an area around a vehicle has front wheels that serve as steered wheels. The device includes an image display system that provides a back image of the vehicle to an operator of the vehicle during backing up. The image display system switches from the back image of the vehicle to a side image of the vehicle on an outside of turn in accordance with a state of the turn of the vehicle so as to provide the side image of the vehicle to the operator.

According to an embodiment of the invention, a device for monitoring an area around a vehicle has front wheels that serve as steered wheels. The device includes an image display system that provides an image of a side in front of the vehicle on a parking space side to an operator of the vehicle during parallel parking by backing up to a parking space when the front wheels move from a first state in which the front wheels are steered toward the parking space side, to a second state in which the front wheels are steered to a side opposite the parking space side during parallel parking of the vehicle.

In the embodiment, a camera image of an area to the side of the vehicle that is on the same side as a parking space in which the vehicle is to be parallel parked, is provided to the driver when front wheels, which serve as steered wheels, are moved from a first state, in which they are steered toward the parking space side, to a second state, in which they are steered to the side opposite the parking space side, when the vehicle is parallel parking in a parking space behind the vehicle.

When the front wheels are in the second state when parallel parking, a state is created in which the front portion of the vehicle body will move significantly toward the parking space side. In this case, the front portion of the vehicle body is likely to contact an obstacle, such as a vehicle parked in front, that is in front of the parking space where the vehicle is to be parallel parked. According to this invention, however, when the front wheels have moved to the second state, a camera image of the side in front of the vehicle on the parking space side, i.e., a camera image of the area around the portion of the vehicle where the likelihood of contact with an obstacle when parallel parking the vehicle increases, is provided to the driver. Accordingly, helpful information is provided to the driver without requiring an operation by the driver.

In this case, it is sufficient that a camera image of the area in front of the vehicle on the parking space side is provided to the driver at the most appropriate time when the front wheels are in at least the second state. Provision of the image of the side in front of the vehicle to the operator may be started at a time when the front wheels move from the first state to the second state. Alternatively, provision of the image of the side in front of the vehicle to the operator may be started at a time when the vehicle moves to a predetermined position after the front wheels have moved from the first state to the second state, as the point at which the front portion of the vehicle comes the closest to an obstacle in front of the parking space when parallel parking is the point after the vehicle has backed up a certain extent after the front wheels are moved to the second state.

In the case where provision of the image of the side in front of the vehicle to the operator may be started at a time when the vehicle moves to a predetermined position after the front wheels have moved from the first state to the second state.

Before the camera image of the area in front of the vehicle on the parking space side starts to be provided to the driver when parallel parking the vehicle, a camera image of the area to the back, as well as a camera image of the area to the side of the vehicle maybe provided to the driver, to further ensure safety when parallel parking.

Further, one of a back image and a side image of the vehicle may be provided to the operator before starting provision of the image of the side in front of the vehicle on the parking space side.

Also, the camera image of the area in front of the vehicle on the parking space side is sufficient if it includes the point where the front portion of the vehicle is closest to the obstacle.

Provision of the image of the side in front of the vehicle on the parking space side is continued for a predetermined time period from start of provision of the image to the operator.

One of the back image and the side image of the vehicle may be provided to the operator after completion of provision of the image of the side in front of the vehicle on the parking space side to the operator.

According to another embodiment, a device for monitoring an area around a vehicle having front wheels that serve as steered wheels. The device includes an image display system that provides a back image of the vehicle to an operator of the vehicle during backing up, and a controller that determines whether an angle of the vehicle reaches a predetermined value, wherein the image display system switches the back image of the vehicle to a side image of the vehicle on an outside of turn when it is determined by the controller that the angle of the vehicle has reached the predetermined value during backing up so as to provide the side image of the vehicle on the outside of turn to the operator.

According to the embodiment, a camera image of an area in back of the vehicle is provided to a driver when a vehicle in which the front wheels are steered wheels is backing up, while a camera image of an area to the side of the vehicle that is on the inside of the turn when the vehicle is backing up in a turn is provided to the driver when an angle of the vehicle reaches a predetermined angle.

According to this construction, the driver is provided with a camera image of an area around a portion of the vehicle in which the likelihood of contact with an obstacle due to the difference in the outer turning radii of the front and back wheels increases when backing the vehicle up in a turn. As a result, helpful information is provided to the driver without an operation by the driver. Further, the camera image of the area to the side of the vehicle that is on the outside of the turn when backing up in a turn is sufficient if it includes the point where the front portion of the vehicle is closest to an obstacle in front of the vehicle.

Provision of the side image to the operator may be continued for a predetermined period of time.

The side image of the vehicle may be switched to the back image of the vehicle so as to be provided to the operator after completion of provision of the side image.

DETAILED DESCRIPTION OF the PREFERRED EMBODIMENTS

Figure 1:
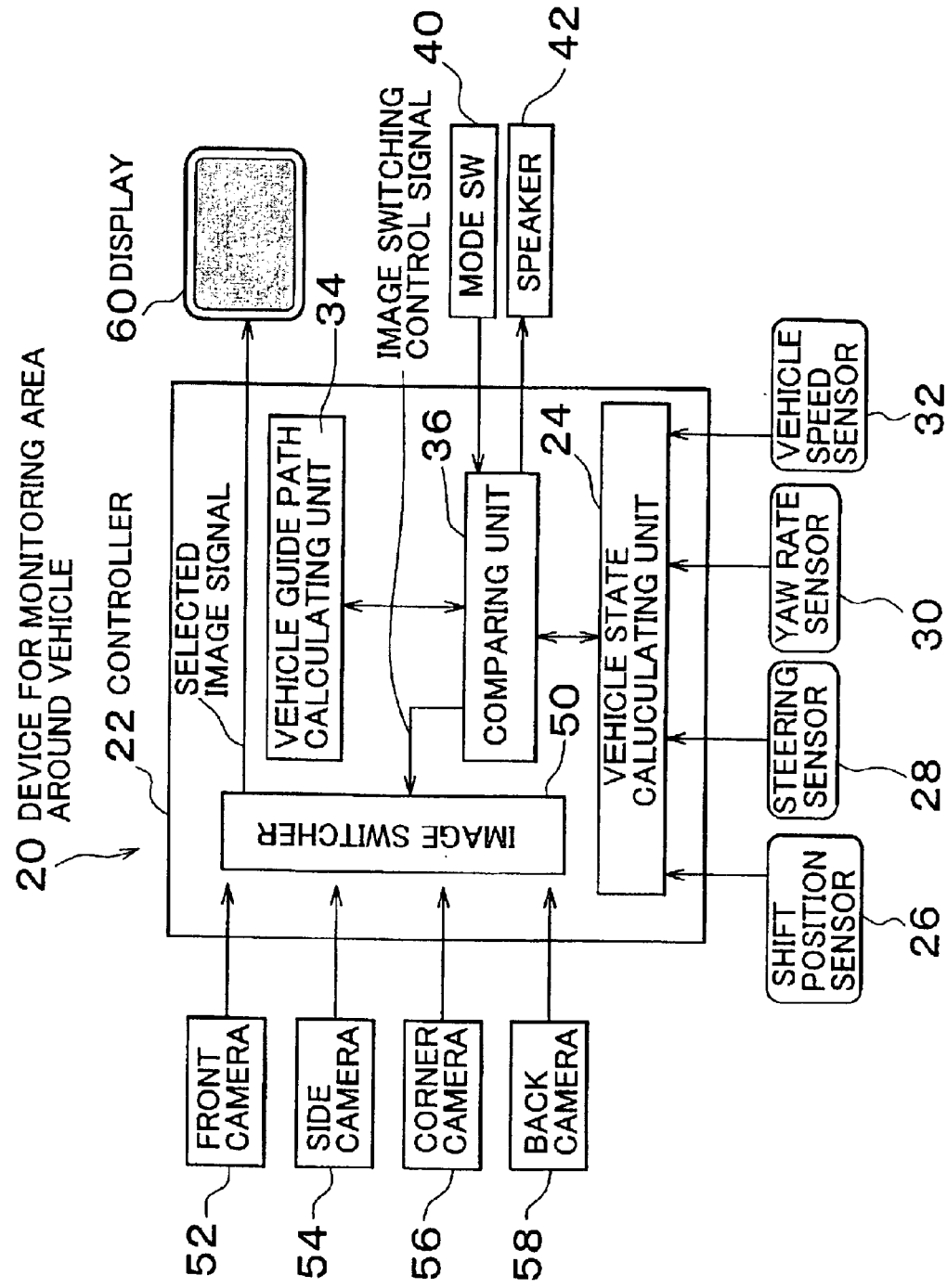
FIG. 1 is a system block diagram of the device for monitoring an area around a vehicle according to one exemplary embodiment of the invention.

FIG. 1 is a system block diagram of a device 20 for monitoring an area around a vehicle, which is one exemplary embodiment of the invention. According to this exemplary embodiment, a vehicle in which the device (hereinafter referred to as "monitoring device") 20 for monitoring an area around a vehicle has front wheels which function as steered wheels that are steered according to a steering operation by an occupant (e.g., a driver), and rear wheels which function as non-steered wheels. The monitoring device 20 includes an electronically controlled computer (hereinafter referred to as simply "controller") 22 for monitoring, by which the monitoring device 20 is controlled.

The controller 22 houses a vehicle state calculating unit 24 that is connected to a shift position sensor 26, a steering angle sensor 28, a yaw rate sensor 30, and a vehicle speed sensor 32. The shift position sensor 26 generates a signal indicative of a position of a shift lever operated by the driver of the vehicle. The steering angle sensor 28 generates a signal indicative of a steering angle $\theta$ of a steering wheel operated by the driver. The yaw rate sensor 30 generates a signal indicative of a rotation speed (hereinafter referred to as "yaw rate $\omega$") generated around the center of gravity of the vehicle. The vehicle speed sensor 32 generates a pulse signal at a cycle indicative of a vehicle speed SPD.

Each of the output signals from the shift position sensor 26, the steering angle sensor 28, the yaw rate sensor 30, and the vehicle speed sensor 32 is supplied to the vehicle state calculating unit 24. The vehicle state calculating unit 24 then detects the position of the shift lever based on the output signal from the shift position sensor 26, detects the steering angle θ based on the output signal from the steering angle sensor 28, detects the yaw rate ω generated around the center of gravity of the vehicle based on the output signal from the yaw rate sensor 30, and detects the vehicle speed SPD based on the output signal from the vehicle speed sensor 32. Then the vehicle state calculating unit 24 estimates a turning radius R produced by the vehicle based on the position of the shift lever, the steering angle θ, the yaw rate ω, and the vehicle speed SPD. The vehicle state calculating unit 24 also detects the vehicle position from a reference position.

The controller 22 also houses a vehicle guide path calculating unit 34 which calculates a target path of travel (i.e., guide path) along which the vehicle should travel when parallel parking or backing up. The vehicle guide path calculating unit 34 and the vehicle state calculating unit 24 are both connected to a comparing unit 36. Calculation results from both the vehicle guide path calculating unit 34 and the vehicle state calculating unit 24 are supplied to the comparing unit 36, which then compares the calculation results from the vehicle guide path calculating unit 34 with the calculation results from the vehicle state calculating unit 24.

The comparing unit 36 is connected to both a mode switch 40 and a speaker 42 provided in the vehicle cabin. The mode switch 40 is operated by the driver so as to switch the mode of the monitoring device 20 of this exemplary embodiment between a mode for guiding the vehicle when parallel parking (hereinafter referred to as "parallel parking guide mode") and a mode for displaying a path of the vehicle (hereinafter referred to as "path display mode"). The comparing unit 36 detects the mode position of the mode switch 40. In addition, the comparing unit 36 also drives the speaker 42 so that instructions for parallel parking are given to the driver via voice-guidance based on the aforementioned calculation results when the monitoring device 20 is in the parallel parking guide mode.

The controller 22 also houses an image switcher 50 which is connected to the comparing unit 36. This image switcher 50 is connected to a front camera 52 that is mounted in the center on a front portion of the vehicle; a side camera 54 that is mounted on a side portion (e.g., a door mirror) of the vehicle, the side portion being on a side of the vehicle that is opposite the driver; a corner camera 56 that is mounted on a front corner portion of the vehicle; the front corner portion being on a side of the vehicle that is opposite the driver; and a back camera 58 that is mounted in the center on a rear bumper of the vehicle.

Figure 2:
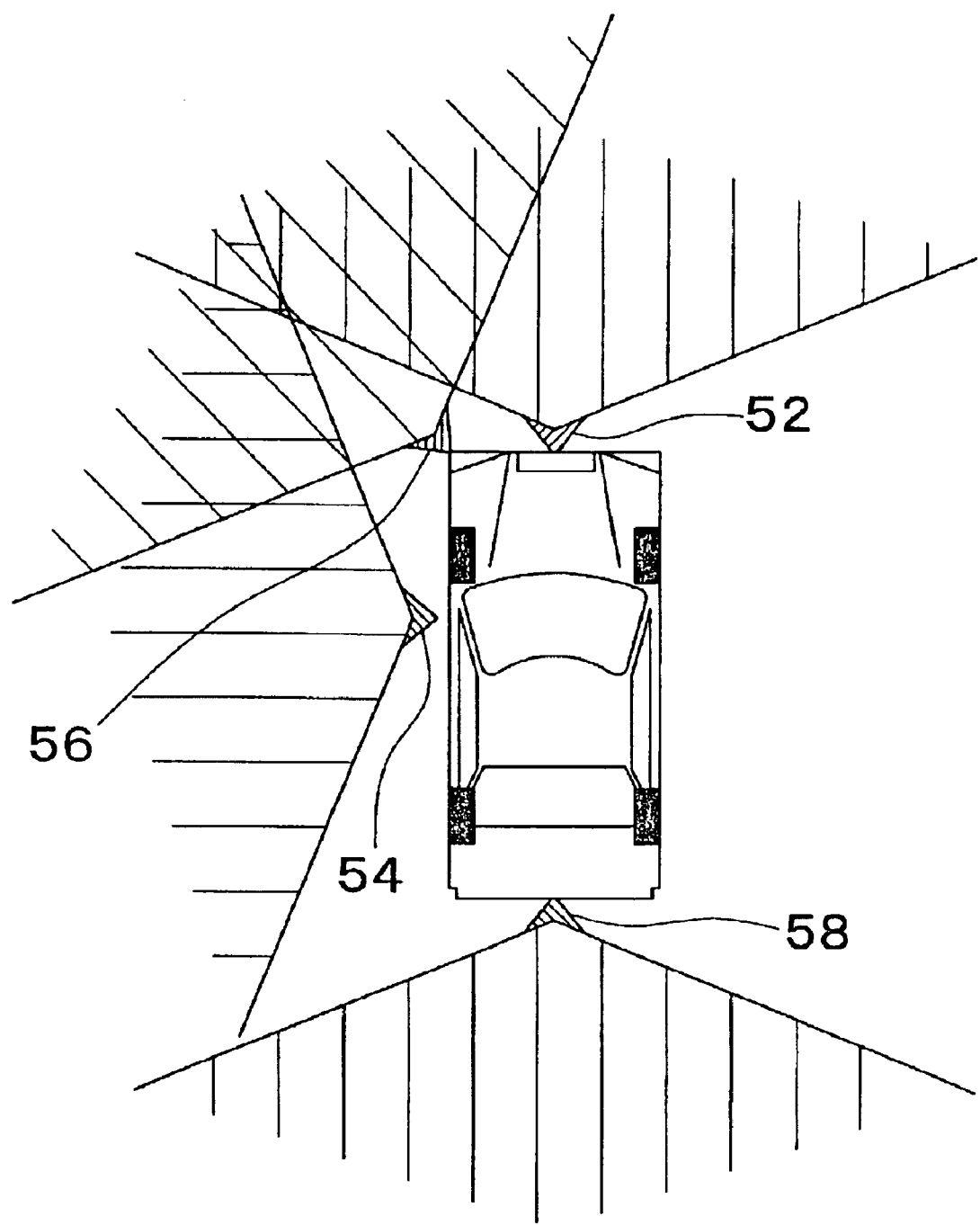
FIG. 2 is a view illustrating the area captured by each camera of the of the device for monitoring an area around a vehicle according to the exemplary embodiment of the invention.

FIG. 2 is a view showing the area captured by each of the cameras 52 through 58 in this exemplary embodiment. As shown in FIG. 2, the front camera 52 captures a predetermined area that extends from substantially the center of the front portion of the vehicle forward, and supplies an image of that area (hereinafter referred to as "front camera image") to the controller 22. The side camera 54 captures a predetermined area that extends from the side portion of the vehicle to the side, and supplies an image of that area (hereinafter referred to as "side camera image") to the controller 22. The corner camera 56 captures a predetermined area that extends from the front corner of the vehicle forward at an angle, and supplies an image of that area (hereinafter referred to as "corner camera image") to the controller 22. Moreover, the back camera 58 captures a predetermined area that extends from the rear center of the vehicle to the rear, and supplies an image of that area (hereinafter referred to as "back camera image") to the controller 22.

Referring back to FIG. 1, the image switcher 50 is also connected to a display 60, which is mounted on a console or the like in the vehicle cabin so as to be viewable by the driver. As described above, the image switcher 50 is connected to the comparing unit 36. The image switcher 50 selects one camera image from among the camera images from the front camera 52, the side camera 54, the corner camera 56, and the back camera 58 based on a command signal supplied from the comparing unit 36, and actuates the display 60 to display the selected camera image.

Next, operation of the device 20 for monitoring an area around a vehicle of this exemplary embodiment will be described. In the controller 22, when the vehicle state calculating unit 24 detects that the shift lever is in a reverse position based on the output signal from the shift position sensor 26 while the ignition switch of the vehicle is ON, the comparing unit 36 supplies a command signal to the image switcher 50 so that the back camera image captured by the back camera 58 is displayed on the display 60. When the image switcher 50 receives this command signal from the comparing unit 36, the image switcher 50 selects the back camera image captured by the back camera 58 as the camera image to be displayed on the display 60, and displays that camera image on the display 60. At this time, the image displayed on the display 60 is an image in which the left and right are reverse from the actual image captured by the back camera 58.

Figure 3A:
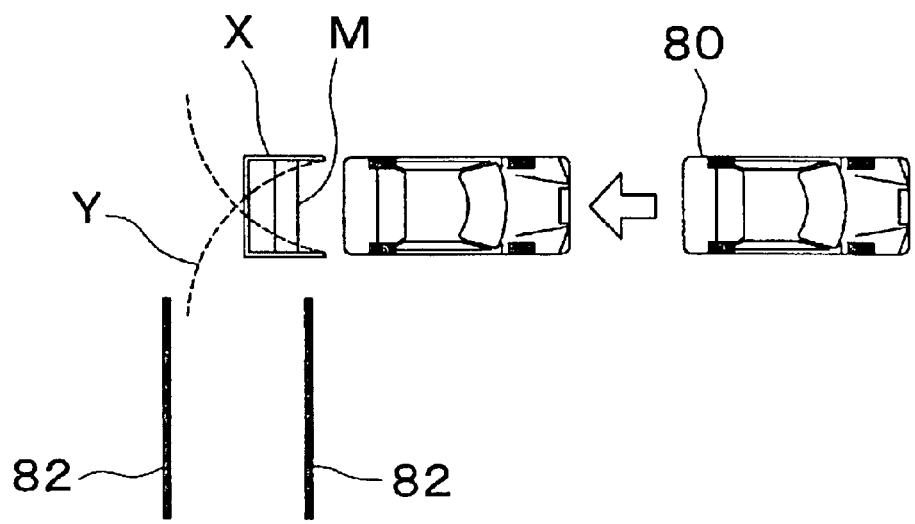
FIG. 3 is a view illustrating an image displayed on the display when the device for monitoring an area around a vehicle according to the exemplary embodiment of the invention is in a path display mode.
Figure 3B:
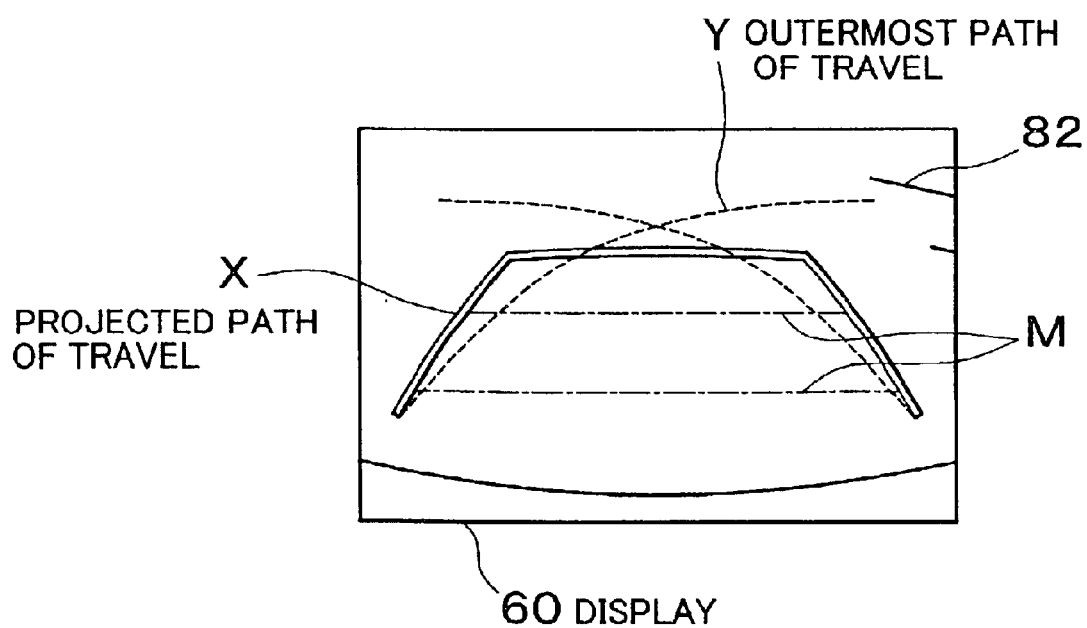
Figure 4A:
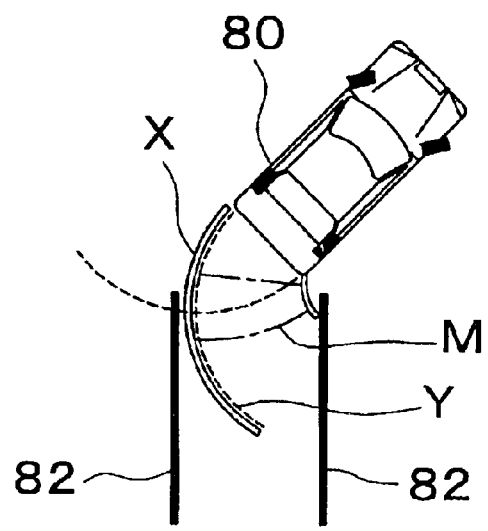
FIG. 4 is a view illustrating another image displayed on the display when the device for monitoring an area around a vehicle according to the exemplary embodiment of the invention is in the path display mode.
Figure 4B:
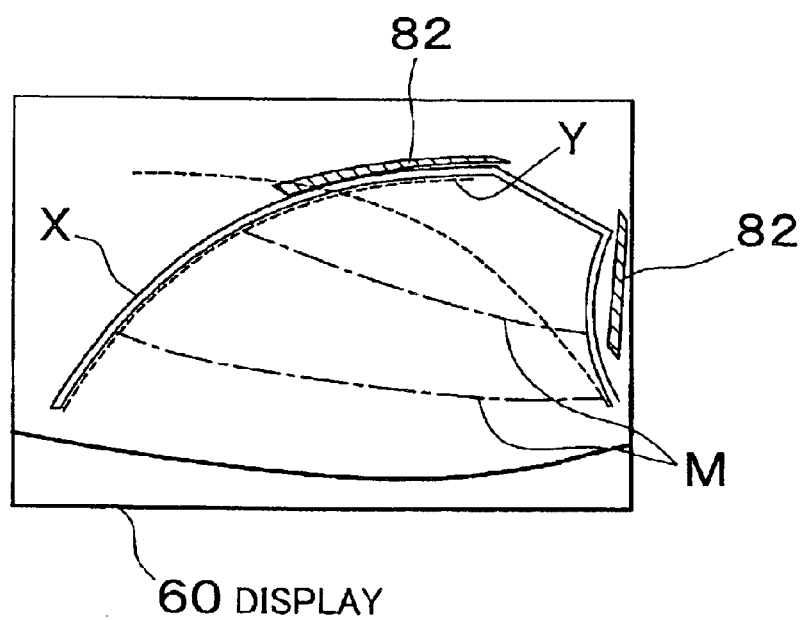

FIGS. 3A, 3B and 4A, 4B are views illustrating images displayed on the display 60 when the monitoring device 20 is in the path display mode in this exemplary embodiment. FIGS. 3A and 4A are views showing sequential states of the vehicle 80 as it backs into a parking space between two white lines 82. FIGS. 3B and 4B are views showing, in frame format, images displayed on the display 60 when the vehicle 80 is in the states shown in FIGS. 3A and 4A, respectively.

The vehicle state calculating unit 24 calculates a projected path (hereinafter referred to as "projected path of travel") X along which it is estimated that the vehicle will actually travel based on the turning radius R estimated as described above. At the same time, the vehicle state calculating unit 24 also calculates a path (hereinafter referred to as "outermost path of travel") Y of the outermost side of the vehicle on the outside of the turn when the vehicle temporarily travels at the maximum allowed steering angle θ max to the left or right. When the vehicle state calculating unit 24 detects that the shift lever is in the reverse position and the mode switch 40 is switched so that it is not in the parallel parking guide mode position, i.e., the mode switch 40 switched to the path display mode position, the comparing unit 36 supplies the image switcher 50 with a command signal so that the calculated projected path of travel X and the calculated outermost path of travel Y are displayed superimposed on the display 60, which displays the back camera image from the back camera 58.

When the image switcher 50 receives the command signal from the comparing unit 36, the image switcher 50 displays the projected path of travel X and the outermost path of travel Y superimposed on the back camera image on the display 60. At this time, two lines (hereinafter referred to as "distance indicator lines") M that extend in the lateral direction of the vehicle at predetermined distances (e.g., 50 cm and 1 m) from a rear end portion of the vehicle 80 are displayed orthogonal to the lines of the projected path of travel X that extend in the direction along both sides of the vehicle. In FIGS. 3A, 3B and 4A, B, the projected path of travel X is indicated by the solid line, the outermost path of travel Y is indicated by the broken lines, and the distance indicator lines M are indicated by the chain lines.

When the driver backs the vehicle 80 up into a parking space between the white lines 82, the driver first backs the vehicle 80 up until the outermost path of travel Y heading toward the white lines 82, from among the outermost path of travel Y while steering left and the outermost path of travel Y while steering right, substantially overlaps with the white line 82, from among the two white lines 82, that is positioned farther from the actual position of the vehicle 80 on the display 60. Then the driver stops the vehicle 80 and turns the steering wheel of the vehicle until the path of the outside of the turn of the projected path of travel X matches the outermost path of travel Y on the display 60. When the path of the outside of the turn of the projected path of travel X matches the outermost path of travel Y on the display 60, the driver stops turning the steering wheel and backs up, keeping the steering wheel in that position (i.e., maintaining the steering angle θ). Then, at the appropriate time, the driver starts to return the steering wheel to the neutral position. When the vehicle 80 is parallel with the white lines 82, the driver puts the steering wheel in the neutral position and backs the vehicle 80 up until it is in the desired position between the white lines 82.

In this way, according to the monitoring device 20 of this exemplary embodiment, if the path display mode is selected by the driver while the shift lever is in the reverse position, the back camera image is displayed on the display 60. In addition, the projected path of travel X and the outermost path of travel Y are also superimposed on the display 60. This assists the driver with steering when backing the vehicle 80 into a parking space. Accordingly, this device enables even an inexperienced driver to steer appropriately when parking.

FIGS. 5A, 5B through 10A, 10B are views illustrating images displayed on the display 60 when the monitoring device 20 is in the parallel parking mode, according to this exemplary embodiment. FIGS. 5A through 10A are views showing sequential states of the vehicle 80 as it is parallel parked into a parking space between one vehicle (hereinafter referred to as "vehicle parked in front") 90 and another vehicle (hereinafter referred to as "vehicle parked in back") 92. FIGS. 5B through 10B are views showing, in frame format, images displayed on the display 60 when the vehicle 80 is in the states shown in FIGS. 5A through 10A, respectively.

Figure 5A:
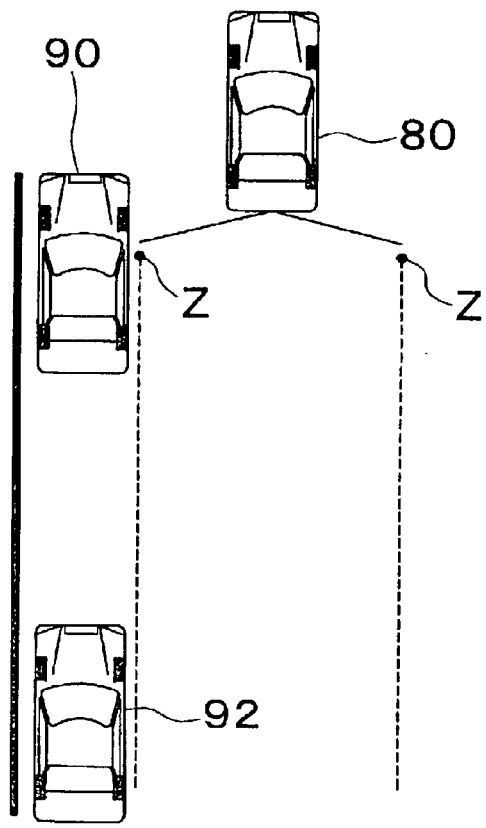
FIG. 5 is a view illustrating an image displayed on the display when the device for monitoring an area around a vehicle according to the exemplary embodiment of the invention is in a parallel parking guide mode.
Figure 5B:
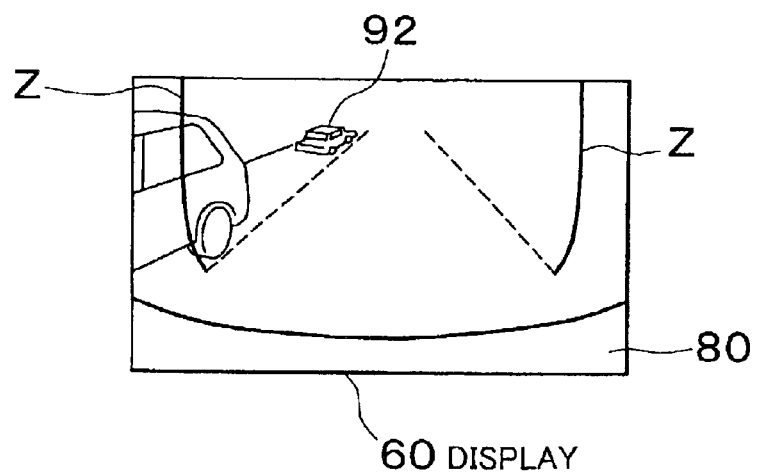

Referring to FIGS. 5A, 5B, when the driver parallel parks the vehicle 80 in a parking space between the vehicle 90 parked in front and the vehicle 92 parked in back, for example, the driver first stops the vehicle 80 in a position parallel with, and approximately 1 m away from, for example, as well as ahead of the vehicle 90 parked in front. Then when the vehicle state calculating unit 24 detects that the shift lever is in the reverse position, the back camera image captured by the back camera 58 is displayed on the display 60.

When the mode switch 40 is switched so that it is in the parallel parking guide mode position while the back camera image is displayed on the display 60, vertical planes extending from the location where the back camera 58 is mounted in a predetermined direction on the left and right within the area able to be captured by the back camera 58 are displayed as lines (indicated by the solid lines in FIG. 5B; hereinafter referred to as orientation lines Z) on the display 60. In addition, parallel lines (indicated by the broken lines in FIGS. 5A, 5B) extending rearward parallel with the vehicle 80, which include the point where those vertical planes contact the ground at a position a predetermined distance (e.g., 1 m) from the vehicle body, are also displayed on the display 60. Also at this time, voice instructions such as, "Back up until the orientation line Z overlaps with the rear end portion of the vehicle 90 parked in front." are issued from the speaker 42. The orientation lines Z appear curved on the display 60 because of distortion in the display from the back camera 58.

Figure 6A:
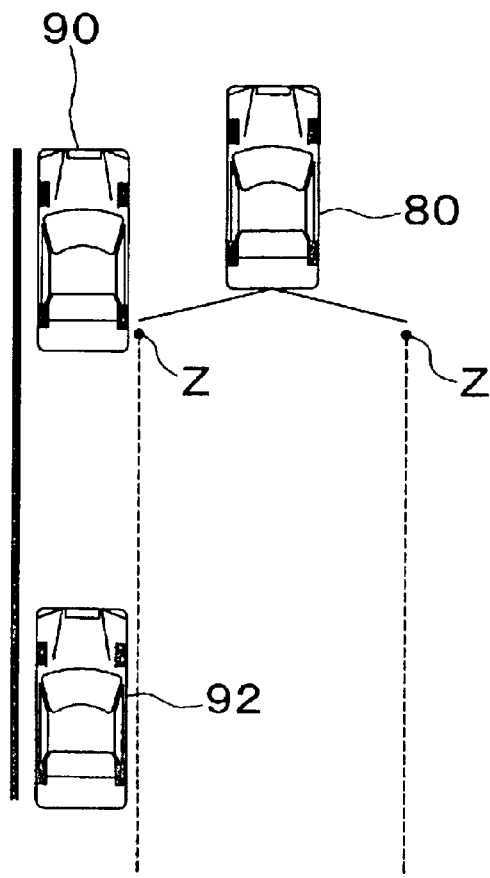
FIG. 6 is a view illustrating another image displayed on the display when the device for monitoring an area around a vehicle according to the exemplary embodiment of the invention is in the parallel parking guide mode.
Figure 6B:
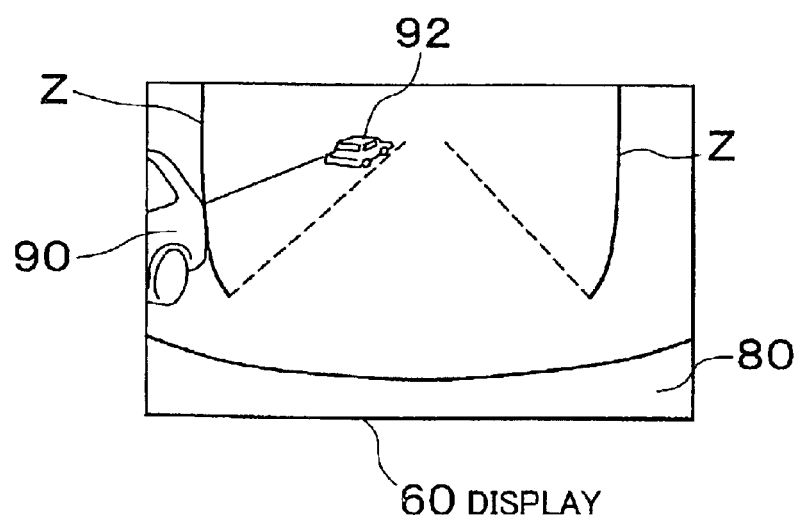

Following the display on the display 60 and the voice instructions from the speaker 42, the driver starts to back the vehicle 80 up while keeping the steering wheel in the neutral position until the orientation line Z to the inside of the turn, of the two orientation lines Z, touches the rear end portion of the vehicle 90 parked in front on the display 60. When the orientation line Z touches the rear end portion of the vehicle 90 parked in front on the display 60, the driver stops the vehicle 80. Hereinafter, this vehicle position will be referred to as "parallel park start position". When the vehicle 80 is in this position, the direction for positioning the vehicle 80 with respect to the vehicle 90 parked in front is established. More specifically, the vehicle 80 is positioned in a direction that creates vertical planes displayed as the orientation lines Z on the display 60, as shown in FIG. 6A, with respect to the vehicle 90 parked in front.

In this exemplary embodiment, after the vehicle 80 stops in a position where the orientation line Z touches the rear end portion of the vehicle 90 parked in front on the display 60, a parking space frame S in which the vehicle is able to be parked in back of the vehicle is displayed on the display 60. This parking space frame S moves on the display 60 in the lateral direction of the vehicle corresponding to the steering angle θ of the vehicle 80. At the same time, voice instructions such as, "While the vehicle 80 is stopped, turn the steering wheel and align the parking space frame S with the parking space." are issued from the speaker 42.

The parking space frame S displays the position and size of the vehicle 80 if it were to be moved a predetermined distance in back of its current position when the driver backs the vehicle 80 up while maintaining the steering angle θ of the steering wheel at the present point, then at a certain point turns the steering wheel all the way to full lock (i.e., to the maximum steering angle) in the opposite direction, and backs the vehicle 80 up in that state. Accordingly, when the parking space frame S is set to the parking space on the display 60, the relative positional relationship of the parallel park start position and a position of the vehicle 80 after parking is complete (hereinafter referred to as "parallel park complete position") is determined. A target path of travel (i.e., a guide path) when the vehicle 80 is traveling from the parallel park start position to the parallel park complete position is then calculated. Hereinafter, the position of the vehicle 80, in which the front wheels that serve as the steered wheels of the vehicle 80 are steered in the target path of travel while the vehicle 80 is stationary by turning the steering wheel from the aforementioned steering angle to the maximum steering angle in the opposite direction, will be referred to as a steering direction reversal point P.

Figure 7A:
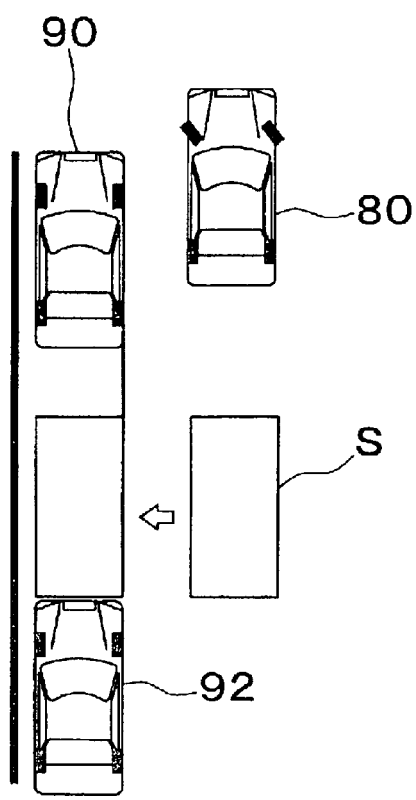
FIG. 7 is a view illustrating another image displayed on the display when the device for monitoring an area around a vehicle according to the exemplary embodiment of the invention is in the parallel parking guide mode.
Figure 7B:
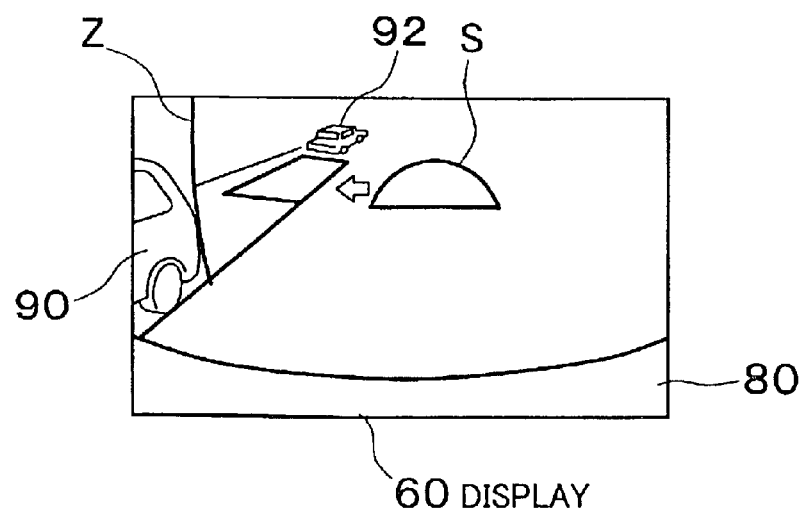

Following the display on the display 60 and the voice instructions from the speaker 42 as shown in FIG. 7B, the driver turns the steering wheel (in a counter-clockwise direction when parallel parking the vehicle 80 in a parking space behind and to the left, as shown in FIGS. 5A, 5B through 10A, 10B) while the vehicle 80 is stopped in the parallel park start position so that the parking space frame S moves to the desired position in the vehicle width position on the display 60. When the parking space frame S is in the desired position on the display 60, the driver then stops turning the steering wheel. Then, with the steering wheel kept in that position, i.e., while maintaining the steering angle θ, the driver backs the vehicle 80 up.

Figure 8A:
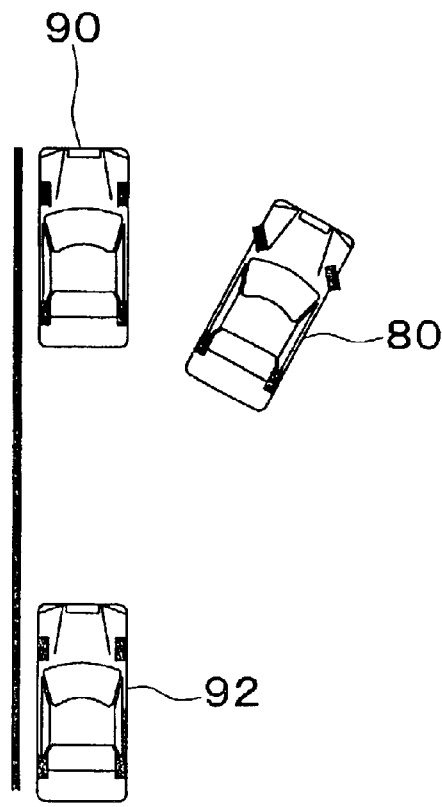
FIG. 8 is a view illustrating yet another image displayed on the display when the device for monitoring an area around a vehicle according to the exemplary embodiment of the invention is in the parallel parking guide mode.
Figure 8B:
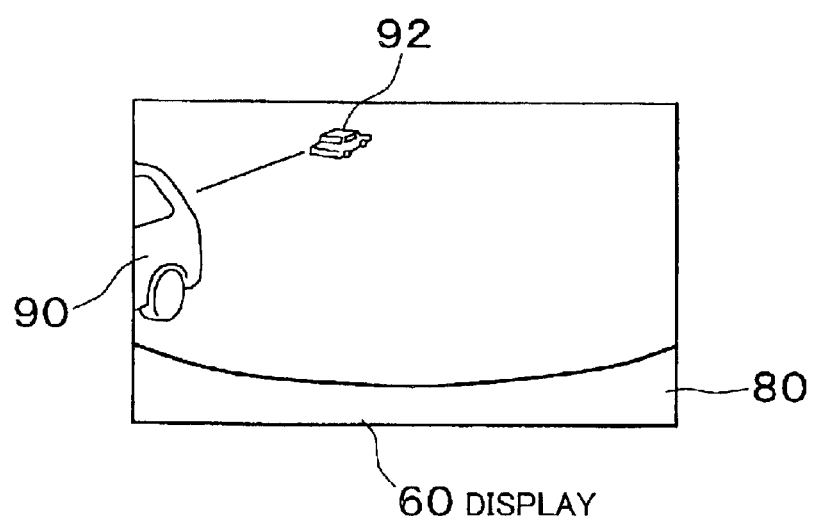
Figure 9A:
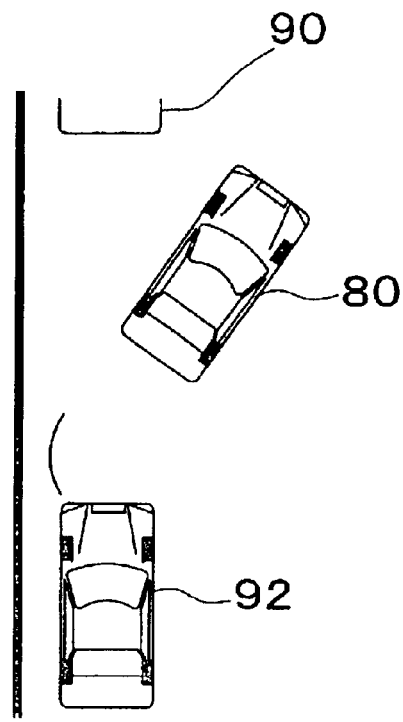
FIG. 9 is a view illustrating still another image displayed on the display when the device for monitoring an area around a vehicle according to the exemplary embodiment of the invention is in the parallel parking guide mode.
Figure 9B:
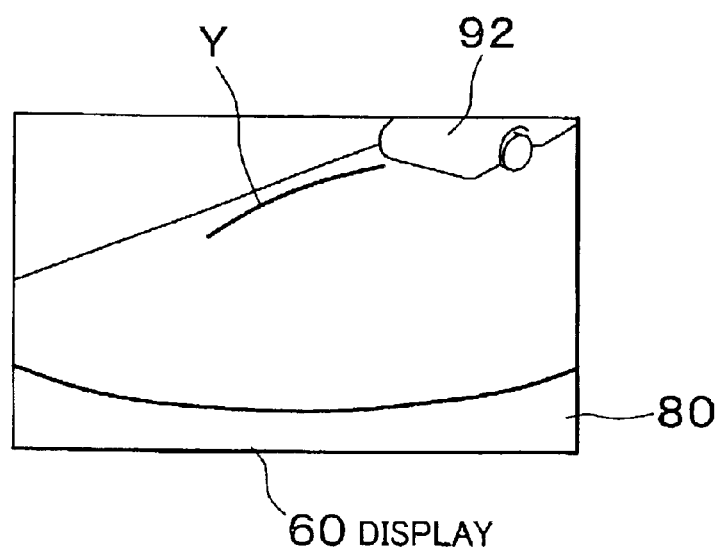

In the exemplary embodiment, the vehicle state calculating unit 24 detects, based on parameters detected using various sensors, the vehicle position from the position (i.e., the parallel park start position) in which the vehicle 80 was stopped so that the orientation line Z touches the rear end portion of the vehicle 90 parked in front on the display 60. When the vehicle 80 starts to back up from the state shown in FIG. 7A, the parking space frame S disappears from the display 60 so that only the back camera image is displayed as shown in FIG. 8B. Referring to FIGS. 9A, 9B, as the vehicle 80 nears the vicinity of the steering direction reversal point P in the target path of travel as calculated above, the outermost path of travel Y is displayed superimposed on the display 60. At the same time, voice instructions such as, "When the outermost path of travel Y overlaps with the outside line of the frame of the parking space, turn the steering wheel all the way in the opposite direction." are issued from the speaker 42.

When the outermost path of travel Y is overlapping with the outside of the frame of the desired parking space on the display 60 after the driver has backed the vehicle 80 up, the driver then stops the vehicle 80 assuming it has reached the steering direction reversal point P. The driver then turns the steering wheel (in a clockwise direction when the vehicle 80 is being parallel parked in a parking space to the left and behind, as shown in FIGS. 5A, 5B through 10A, 10B) while the vehicle 80 is stationary until the steering angle θ has reached the maximum steering angle. The driver then backs the vehicle 80 up in this state.

Figure 10A:
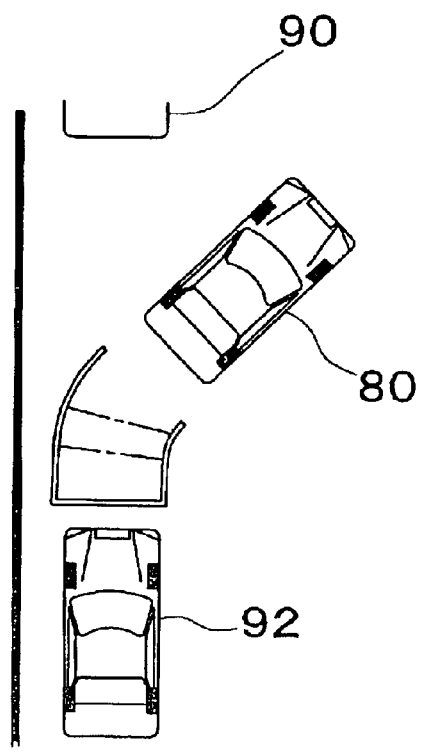
FIG. 10 is a view illustrating yet another image displayed on the display when the device for monitoring an area around a vehicle according to the exemplary embodiment of the invention is in the parallel parking guide mode.
Figure 10B:
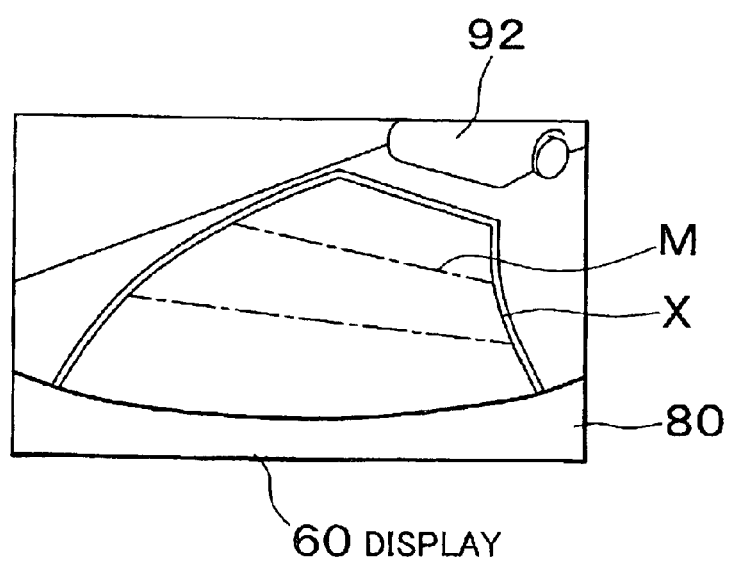

According to this exemplary embodiment, the vehicle state calculating unit 24 detects a vehicle angle δ at which the vehicle 80 is actually headed using the direction of the vehicle 80 when it has reached the steering direction reversal point P as a reference, based on either an integral value of the yaw rate ω or the relationship between the steering angle θ of the steering wheel and the vehicle speed SPD when the monitoring device 20 is in the parallel parking guide mode. This vehicle angle δ is a value that changes as the vehicle 80 backs up in a turn. When the vehicle 80 starts to back up as described above, the outermost path of travel Y disappears from the display 60 and the projected path of travel X corresponding to the steering angle θ and the distance indicator lines M are superimposed on the display 60 as shown in FIGS. 10A, 10B. The driver then refers to the display on the display 60, specifically to the distance indicator lines M on the display 60, and turns the steering wheel so that the vehicle 80 becomes parallel with the outside of the frame of the desired parking space. In addition, the driver adjusts the forward-backward position of the vehicle 80 with respect to the vehicle 90 parked in front and the vehicle 92 parked in back.

In this way, according to the monitoring device 20 of this exemplary embodiment, if the parallel parking guide mode is selected by the driver while the shift lever is in the reverse position, the back camera image is displayed on the display 60. In addition, various lines to assist with parking are also superimposed on the display 60. Therefore, by operating the steering wheel, accelerator pedal, and brake pedal while looking at these various parking-assist lines, the driver is able to parallel park in a parking space between the vehicle 90 parked in front and the vehicle 92 parked in back from the parallel park start position without contacting either of them. That is, according to this exemplary embodiment, assistance is provided to the driver when parallel parking. Accordingly, this device enables even an inexperienced driver to steer appropriately when parking.

In order to parallel park the vehicle 80 appropriately in the parking space in back of the vehicle 90 parked in front, between the vehicle 90 parked in front and the vehicle 92 parked in back, from a position parallel with and adjacent to the vehicle 90 parked in front, the driver must steer the front wheels by turning the steering wheel toward the parking space side (i.e., in the counterclockwise direction when parallel parking the vehicle 80 in a parking space behind and to the left). Then at a certain point, the driver must steer the front wheels in the opposite direction by changing the steering direction and turning the steering wheel to the opposite side (i.e., in the clockwise direction when parallel parking the vehicle 80 in a parking space behind and to the left) past the neutral position.

Hereinafter, the turned state of the front wheels immediately after the driver has started to parallel park will be referred to as the "first state". The turned state of the front wheels after the steering wheel has been turned in the opposite direction past the neutral position will be referred to as the "second state". The actual path of the vehicle when the front wheels are in the first state will be referred to as the "first circular turn". The actual path of the vehicle when the front wheels are in the second state will be referred to as the "second circular turn".

Figure 11:
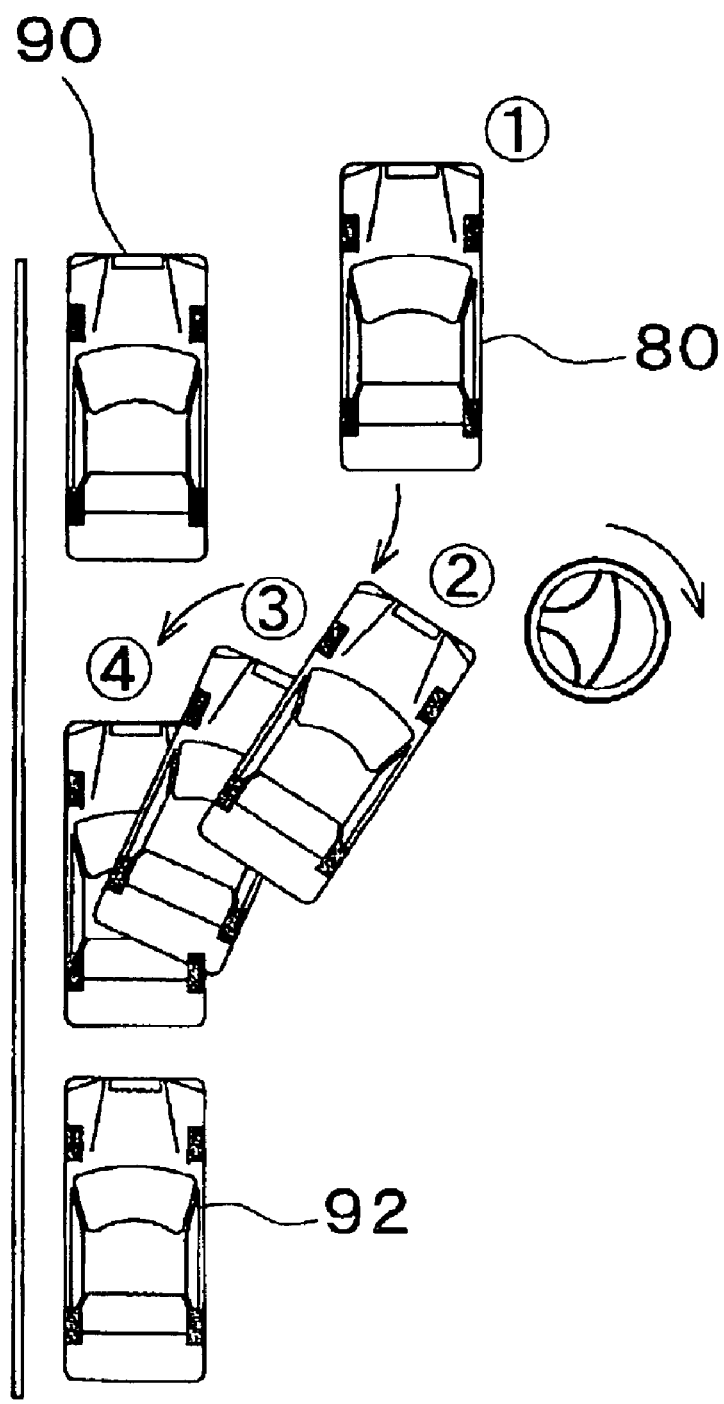
FIG. 11 is a view showing, in frame format, the states of the vehicle created when parallel parking.

FIG. 11 is a view showing, in frame format, the states of the vehicle 80 created during parallel parking. The states of the vehicle 80 are denoted by encircled numbers in the figure which follow a time-series sequence, (1) denoting the parallel park start position, (2) denoting the steering direction reversal point P, (3) denoting the state in which the vehicle 80 is closest to the vehicle 90 parked in front, and (4) denoting the parallel park complete position.

According to the exemplary embodiment, because the front wheels are made the steered wheels and the rear wheels are made the non-steered wheels, when the vehicle 80 backs up in the first circular turn when the front wheels are in the first state, the front portion of the vehicle body turns in the direction away from the vehicle 90 parked in front around a point on a line extending from the rear wheel axle. On the other hand, when the vehicle 80 backs up in the second circular turn when the front wheels are in the second state, the front portion of the vehicle body turns in the direction toward the vehicle 90 parked in front. Accordingly, when the front wheels move from the first state to the second state when parallel parking, a situation is created in which the front portion (the corner portion, in particular) of the vehicle body is likely to contact an obstacle such as the rear portion of the vehicle 90 parked in front, as shown in FIG. 11.

Regarding this, at the point when the front portion of the vehicle body is likely to contact an obstacle when the monitoring device 20 is in the parallel parking guide mode, the corner camera image from the corner camera 56, which captures a view of the area to the front at an angle from the front portion of the vehicle 80, may be used as the camera image displayed on the display 60 instead of the back camera image from the back camera 58 that captures a view of the area in back of the vehicle 80. As a result, an image of the area near the portion of the vehicle 80 that is likely to contact an obstacle is provided to the driver as helpful information, thus enabling even further assistance to be provided to the driver when parallel parking.

Here, the monitoring device 20 has a first characteristic which is that the corner camera image from the corner camera 56 is displayed on the display 60 at the appropriate time when the monitoring device 20 is in the parallel parking guide mode. This characteristic will hereinafter be described.

Figure 12:
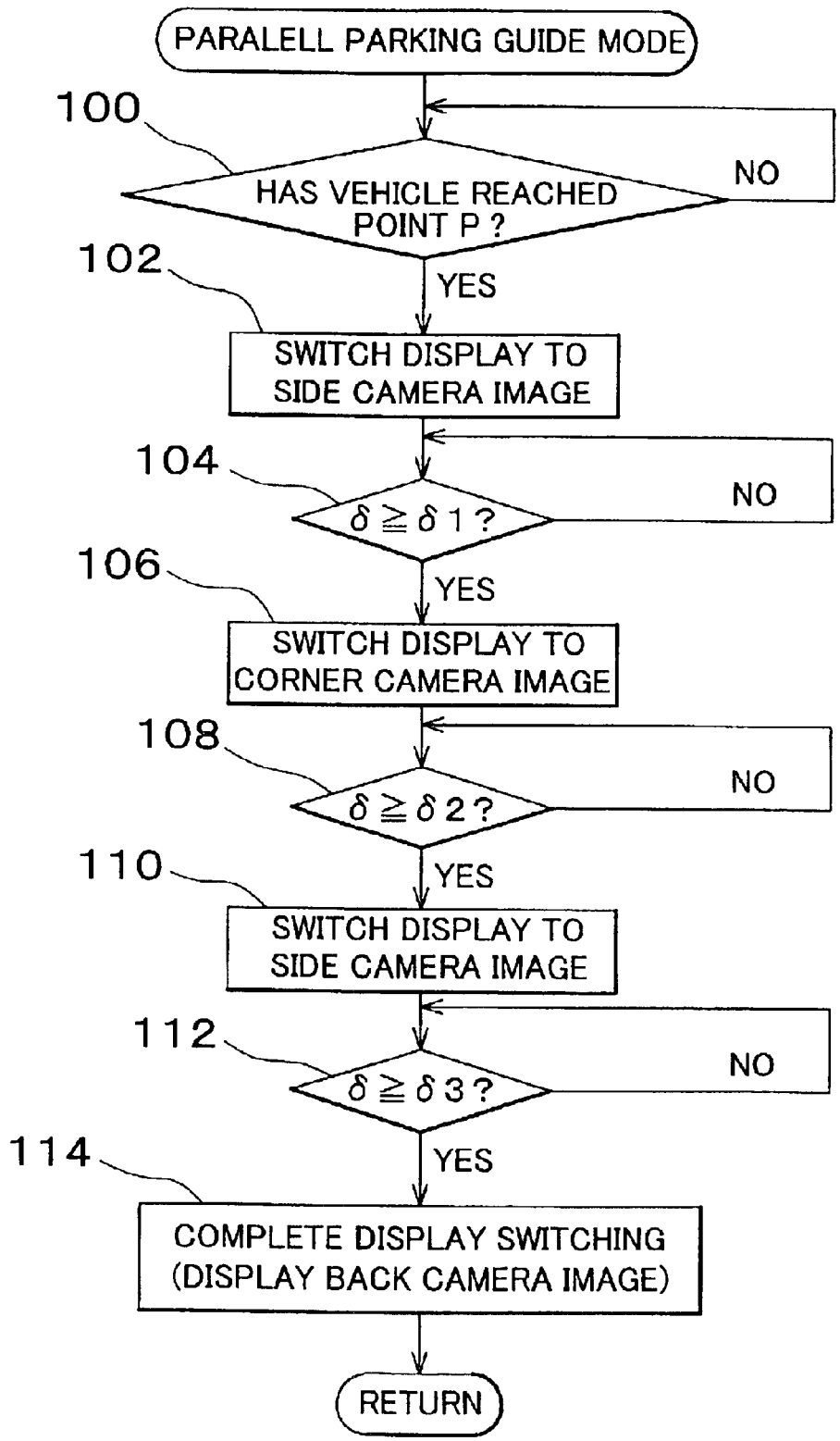
FIG. 12 is a flowchart of a control routine that is executed when the device for monitoring an area around a vehicle according to the exemplary embodiment of the invention is in the parallel parking guide mode.

FIG. 12 is a flowchart of one example of a control routine that is executed by the controller 22 according to this exemplary embodiment to realize the function described above. The routine shown in FIG. 12 is repeatedly started after the last process in the routine ends when the monitoring device 20 is in the parallel parking guide mode. When the routine shown in FIG. 12 starts, first, the process in step 100 is performed. When the parallel parking guide mode has started while the shift lever is in the reverse position, the back camera image from the back camera 58 is first displayed on the display 60.

In step 100, it is determined whether the vehicle 80 has reached the steering direction reversal point P and stopped in the parallel parking process based on comparative results between the vehicle position from the parallel park start position detected by the vehicle state calculating unit 24 and the target path of travel including the steering direction reversal point P calculated in the vehicle guide path calculating unit 34. The process in step 100 is performed repeatedly until it is determined that the foregoing condition is fulfilled. As a result, when it has been determined that the vehicle 80 has reached the steering direction reversal point P and stopped, the process in step 102 is then performed. Alternatively in step 100, it may be determined whether the vehicle 80 has started to back up after it has reached the steering direction reversal point P and stopped.

In step 102, a process is performed for switching the camera image displayed on the display 60 from the back camera image from the back camera 58 that was displayed at first to the side camera image from the side camera 54. When the vehicle 80 first starts to back up after it has reached the steering direction reversal point P, the vehicle 80 is turned at a large angle with respect to the vehicle 90 parked in front, as shown by number (2) in FIG. 11. Therefore, it is highly likely that the rear portion of the vehicle 90 parked in front is captured in the side camera image from the side camera 54 rather than in the corner camera image from the corner camera 56. Therefore, when viewing the rear portion of the vehicle 90 parked in front, the side camera image from the side camera 54 is more suitable than the corner camera image from the corner camera 56.

Figure 13:
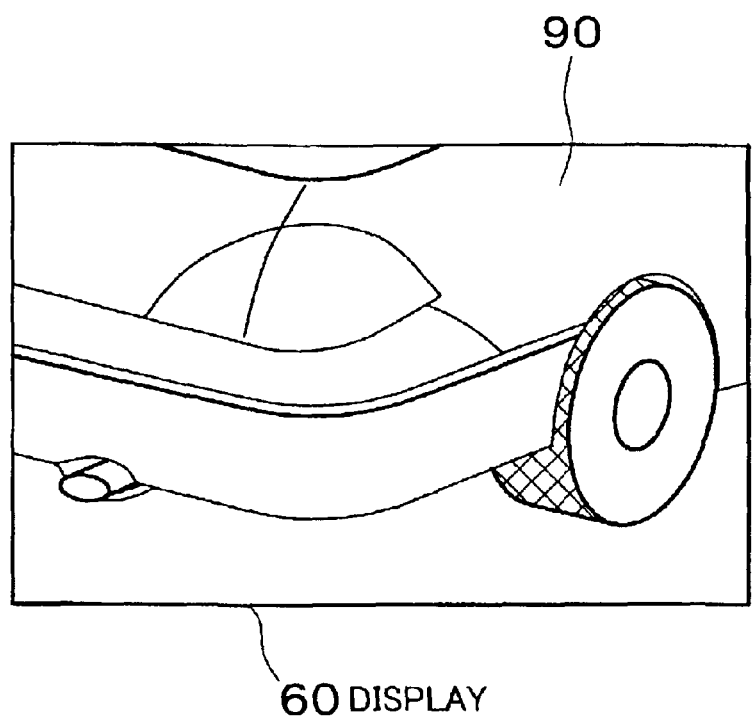
FIG. 13 is a view an image displayed on the display after the vehicle has reached the steering direction reversal point, according to the device for monitoring an area around a vehicle of this exemplary embodiment of the invention.

FIG. 13 is a view of an image displayed on the display 60 after the vehicle 80 has reached the steering direction reversal point P according to this exemplary embodiment. In this way, according to the process in step 102, the side camera image from the side camera 54 is displayed on the display 60, as shown in FIG. 13, immediately after the vehicle 80 has reached the steering direction reversal point P. This enables the driver to view the area around the rear portion of the vehicle 90 parked in front that the vehicle 80 is likely to contact when parallel parking, early on after passing the steering direction reversal point P.

Then in step 104, it is determined whether the angle of the vehicle 80 (hereinafter referred to as vehicle angle $\delta$) after reaching the steering direction reversal point P has reached a predetermined value $\delta 1$. This predetermined value $\delta 1$ is the angle of the vehicle 80 assuming that the front portion of the vehicle body of the vehicle 80 moves closer to the rear portion of the vehicle 90 parked in front from the steering direction reversal point P. If the vehicle 80 is stopped parallel with, and approximately 1 m away from, the vehicle 90 parked in front and the position where the orientation line Z overlaps with the rear end portion of the vehicle 90 parked in front is the parallel park start position, the vehicle angle $\delta$ of the vehicle 80 in which the front portion of the vehicle body of the vehicle 80 moves close to the rear portion of the vehicle 90 parked in front from the steering direction reversal point P is estimated to be a nearly constant value. As a result, this value is set as the predetermined value $\delta 1$. The process in step 104 is repeatedly performed until it is determined that $\delta \geq \delta 1$. When Yes is obtained, that is, it is determined that $\delta \geq \delta 1$, the routine in step 106 is then performed.

In step 106, a process is performed for switching the camera image displayed on the display 60 from the side camera image from the side camera 54 to the corner camera image from the corner camera 56.

Figure 14:
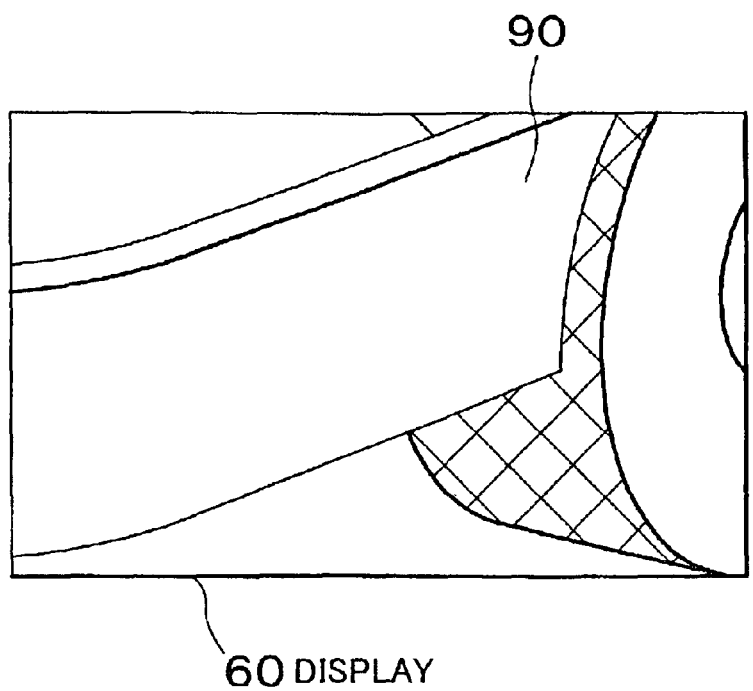
FIG. 14 is a view showing the image displayed on the display when the vehicle nears the obstacle, according to the device for monitoring an area around a vehicle of this exemplary embodiment of the invention.

FIG. 14 is a view showing the image displayed on the display 60 when the vehicle 80 nears the vehicle 90 parked in front, according to the exemplary embodiment. When the process in step 106 is performed, a view of the area around the rear portion of the vehicle 90 parked in front from the corner camera 56 mounted on the front portion of the vehicle body appears on the display 60, as shown in FIG. 14.

Then in step 108, it is determined whether the vehicle angle $\delta$ of the vehicle 80 after it has reached the steering direction reversal point P has reached a predetermined value $\delta 2$. This predetermined value $\delta 2$ is a vehicle angle assuming that the vehicle 80 has passed the position where it is closest to the rear portion of the vehicle 90 parked in front, and is set to a value greater than the predetermined value $\delta 1$ by only a predetermined angle (i.e., $\delta 2 > \delta 1$). As the vehicle 80 continues to back up in a turn after the point where it has come the closest to the rear portion of the vehicle 90 parked in front when parallel parking, the vehicle 80 then gradually moves away from the vehicle 90 parked in front. Therefore, after the vehicle 80 has passed the position where it is closest to the vehicle 90 parked in front, it is no longer necessary to monitor the relative positional relationship between the corner portion of the front portion of the vehicle body and the vehicle 90 parked in front. Instead, it is more appropriate to monitor the relative positional relationship between the vehicle 80 and the shoulder of the road. Here, when it is determined in step 108 that $\delta \geq \delta 2$, the process in step 110 is then performed.

In step 110, a process is performed for switching the camera image displayed on the display 60 from the corner camera image from the corner camera 56 to the side camera image from the side camera 54. When the process in step 110 is performed, a view of the area to the side of the vehicle 80 appears on the display 60.

In step 112, it is determined whether the vehicle angle $\delta$ of the vehicle 80 after it has reached the steering direction reversal point P has reached a predetermined value $\delta 3$. This predetermined value $\delta 3$ is a vehicle angle assuming that the vehicle 80 is parallel with the parking space, and is set to a value greater than the predetermined value $\delta 2$ (i.e., $\delta 3 > \delta 2$). After the vehicle 80 is parallel with the parking space, it is no longer necessary to monitor the area to the side of the vehicle 80. Instead, it is more appropriate to monitor the relative positional relationship between the front and back of the vehicle 80 and the vehicle 90 parked in front and the vehicle 92 parked in back. Here, when it is determined in step 112 that $\delta \geq \delta 3$, the process in step 114 is then performed.

In step 114, a process is performed for completing the switching of the display on the display 60 and displaying the back camera image from the back camera 58 on the display 60. When the process in step 114 is performed, a view of the area in back of the vehicle 80 appears on the display 60. When the process in step 114 is complete, this cycle of the routine ends.

According to the routine shown in FIG. 12, after the front wheels have moved from the first state to the second state when parallel parking, the vehicle 80 moves from the first circular turn to the second circular turn along the target path of travel and is turned at an angle by just the predetermined value δ1 from the steering direction reversal point P. As a result, when the front portion of the vehicle body nears the rear portion of the vehicle 90 parked in front, it is possible to display the corner camera image from the corner camera 56 mounted on the corner portion of the front portion of the vehicle body on the display 60, instead of the back camera image from the back camera 58 mounted on the rear portion of the vehicle body.

By displaying the corner camera image from the corner camera 56 when the front portion of the vehicle body nears the vehicle 90 parked in front, a view of the area of the portion of the vehicle 80 that is likely to contact the vehicle 90 parked in front is provided to the driver. Accordingly, the driver is able to know just how close the vehicle 80 is to the vehicle 90 parked in front, thereby enabling the driver to easily make the appropriate operations when parallel parking. Regarding this, according to this exemplary embodiment, images helpful to the driver that assist in the operation of the vehicle when parallel parking are provided to the driver at the appropriate time. The corner camera image from the corner camera 56 is displayed on the display 60 according to a determination by the device, not an operation by the driver. Therefore, the monitoring device 20 according to the exemplary embodiment enables helpful images to be provided to the driver when parallel parking, without requiring an operation by the driver.

Furthermore, according to this exemplary embodiment, the side camera image from the side camera 54 is displayed on the display 60 after the vehicle 80 has reached the steering direction reversal point P and before the corner camera image from the corner camera 56 is displayed on the display 60. When the vehicle 80 first starts the second circular turn along the target path of travel after reaching the steering direction reversal point P, the vehicle 80 is turned at a large angle with respect to the vehicle 90 parked in front, so it is highly likely that the side camera image from the side camera 54, rather than the corner camera image from the corner camera 56, shows the rear portion of the vehicle 90 parked in front. Therefore, according to the monitoring device 20 of this exemplary embodiment, it is possible for the driver to view the area around the rear portion of the vehicle 90 parked in front that the vehicle 80 is likely to contact early on after the vehicle 80 has reached the steering direction reversal point P.

After the vehicle 80 has passed the position in which it is closest to the rear portion of the vehicle 90 parked in front, it is no longer necessary to monitor the relative positional relationship between the vehicle 80 and the vehicle 90 parked in front to avoid contact therebetween. Instead, it becomes necessary to monitor the relative positional relationship of the vehicle 80 and the shoulder of the road to avoid contact therebetween. In this exemplary embodiment, after the vehicle 80 passes the position in which it is closest to the rear portion of the vehicle 90 parked in front, the image displayed on the display 60 switches from the corner camera image from the corner camera 56 to the side camera image from the side camera 54.

Moreover, after the vehicle 80 is parallel with the parking space, it becomes necessary to monitor the relative positional relationship between the vehicle 80 and the vehicle 90 parked in front and the vehicle 92 parked in back in order to adjust the position of the vehicle 80 in the forward and backward directions. In this exemplary embodiment, when the vehicle 80 is parallel with the parking space, the image displayed on the display 60 switches from the side camera image from the side camera 54 to the back camera image from the back camera 58.

In this way, according to the monitoring device 20 of this exemplary embodiment, it is possible for the driver to view the area where the vehicle 80 is likely to contact the vehicle 90 parked in front and vehicle 92 parked in back when parallel parking without requiring an operation by the driver. This also makes it possible to reduce the operation load on the driver while improving functionality as a device for monitoring the area around a vehicle.

Also, because the front wheels of the vehicle 80 are made steered wheels and the rear wheels of the vehicle 80 are made non-steered wheels, when backing the vehicle 80 up in a turn, there is a difference in the outer turning radii front and rear wheels, which makes the vehicle 80 more likely to contact an obstacle. In particular, when the vehicle 80 is backing up in a turn, with the driver's side being to the inside of the turn, the driver is not able to directly view the area to the side of the side opposite the driver's side, which increases the likelihood of the vehicle 80 contacting an obstacle.

Regarding this, at the point when it is likely that the vehicle 80 will contact an obstacle when backing up in a turn when the monitoring device 20 is in the path display mode, using the side camera image from the side camera 54 that captures the view of the area to the side of the vehicle, instead of the back camera image from the back camera 58 that captures the view of the area to the back of the vehicle as the camera image to be displayed on the display 60, enables an image of the area around the portion of the vehicle 80 that is likely to contact an obstacle to be provided to the driver as helpful information. As a result, it is possible to assist the driver with steering as well as operation of the accelerator and brake pedals and the like when backing up in a turn.

Here, the monitoring device 20 has a second characteristic which is that the side camera image from the side camera 54 is displayed on the display 60 at the appropriate time when the monitoring device 20 is in the path display mode. This characteristic will hereinafter be described.

According to this exemplary embodiment, the vehicle state calculating unit 24 detects, when the monitoring device 20 is in the path display mode, the vehicle angle δ at which the vehicle 80 is actually headed using the direction of the vehicle 80 when that mode started as a reference, based on either the integral value of the yaw rate ω or the relationship between the steering angle θ of the steering wheel and the vehicle speed SPD. This vehicle angle δ is a value that changes as the vehicle 80 backs up in a turn.

Figure 15:
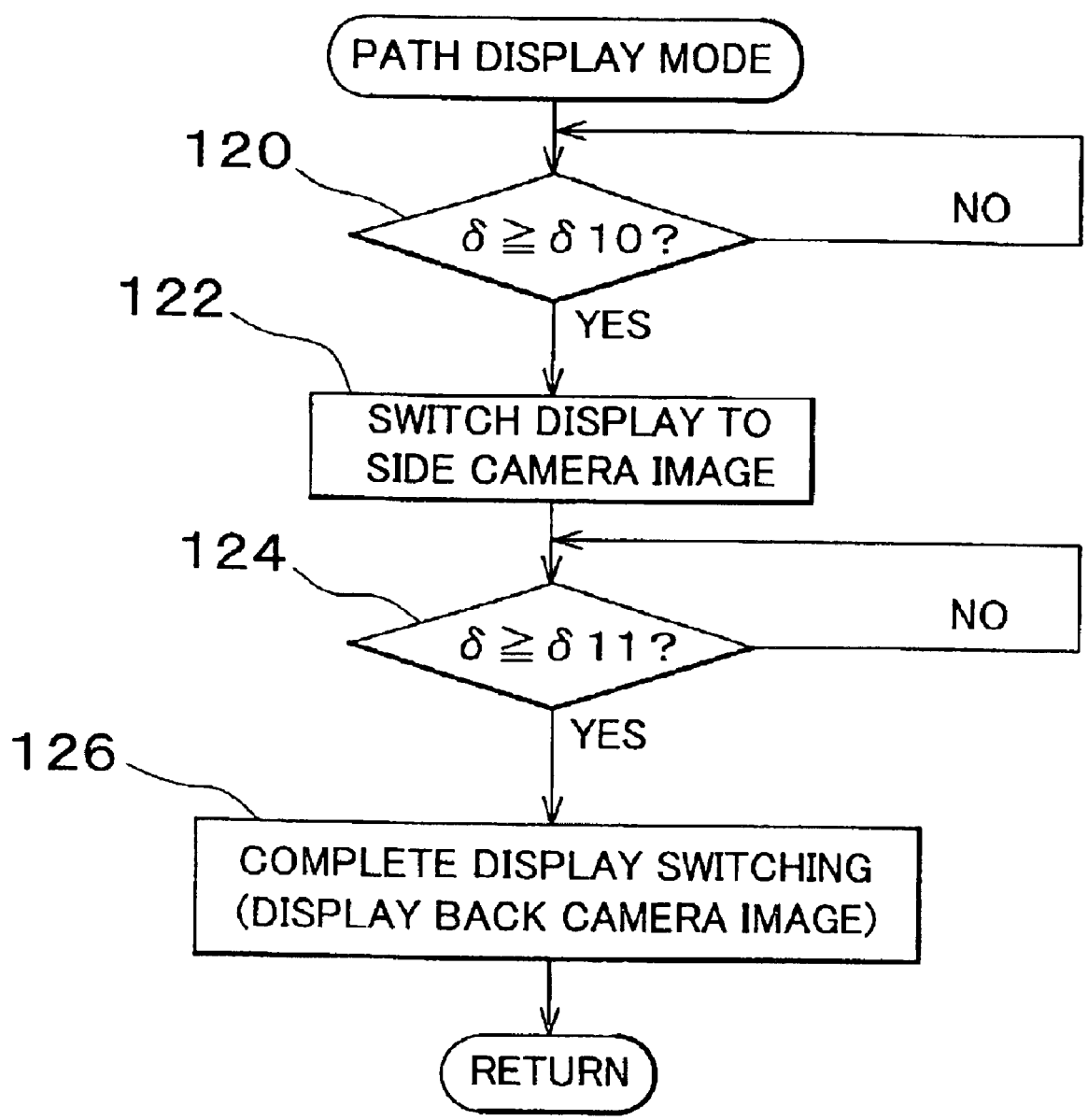
FIG. 15 is a flowchart of a control routine that is executed when the device for monitoring an area around a vehicle according to the exemplary embodiment of the invention is in the path display mode.

FIG. 15 is a flowchart of one example of a control routine executed by the controller 22 according to the exemplary embodiment to realize the function described above. The routine shown in FIG. 15 is a routine that is repeatedly started after the last process in the routine ends when the monitoring device 20 is in the path display mode. When the routine shown in FIG. 15 starts, first, the process in step 120 is performed. When the path display mode has started while the shift lever is in the reverse position, the back camera image from the back camera 58 is first displayed on the display 60.

In step 120, it is determined whether the vehicle angle δ detected by the vehicle state calculating unit 24 when the monitoring device 20 is in the path display mode has reached a predetermined value δ10. This predetermined value δ10 is the smallest vehicle angle at which it is able to be detected that the vehicle 80 is backing up in a turn, after the path display mode has started. The process in step 120 is repeatedly performed until it is determined that the foregoing condition is fulfilled. As a result, when it is determined that δ≧δ10, the process in step 122 is then performed.

In step 122, a process is performed for switching the camera image displayed on the display 60 from the back camera image by the back camera 58 that was displayed at first to the side camera image from the side camera 54. When the process in step 122 is performed, the view of the area in front of the vehicle 80 appears on the display 60 instead of the view of the area in back of the vehicle 80.

In step 124, it is determined whether the vehicle angle δ detected by the vehicle state calculating unit 24 when the monitoring device 20 is in the path display mode has reached a predetermined value δ11. This predetermined value δ11 is a vehicle angle at which the driver can view the entire area to the side of the vehicle 80 after the side camera image from the side camera 54 starts to be displayed on the display 60. This predetermined value δ11 is set to a value greater than the predetermined δ10 by a predetermined angle (i.e., δ11>δ10). As a result, when it has been determined that δ≧δ11, the process in step 126 is then performed.

In step 126, a process is performed for completing the switching of the display on the display 60 and displaying the back camera image from the back camera 58 on the display 60. When the process in step 126 is performed, the view of the area in back of the vehicle 80 appears on the display 60. When the process in step 126 is complete, this cycle of the routine ends.

According to the routine shown in FIG. 15, when the vehicle angle δ of the vehicle 80 when the monitoring device 20 is in the path display mode becomes large enough to where it can be determined that the vehicle 80 is backing up in a turn, it is possible to display the side camera image from the side camera 54 mounted on the side portion of the vehicle body on the display 60 instead of the back camera image from the back camera 58 mounted on the rear portion of the vehicle body.

By displaying the side camera image from the side camera 54 on the display 60 when the vehicle 80 is backing up in a turn, a view of the area around the portion of the vehicle 80 that is likely to contact an obstacle due to the difference in the outer turning radii of the front and rear wheels is provided to the driver. Accordingly, the image enables the driver to know how close the side of the vehicle 80 is to an obstacle, thereby enabling the driver to easily make the appropriate operations when backing up in a turn. Regarding this, according to this exemplary embodiment, images helpful to the driver that assist with operating the vehicle when backing up in a turn are provided to the driver at the appropriate time. The side camera image from the side camera 54 is displayed on the display 60 according to a determination by the device, not by an operation by the driver. Therefore, the monitoring device 20 according to the exemplary embodiment enables helpful images to be provided to the driver when parallel parking, without requiring an operation by the driver.

After the driver has viewed the entire area to the side of the vehicle 80 on the display 60 by angling the vehicle 80 to a certain extent after the side camera image from the side camera 54 starts to be displayed, it is no longer necessary to monitor the situation to the side of the vehicle 80. Instead, it is more appropriate to monitor the situation in back of the vehicle 80 that is backing up. In this exemplary embodiment, when the vehicle 80 continues to back up in a turn to a certain extent, the image displayed on the display 60 switches from the side camera image from the side camera 54 to the back camera image from the back camera 58. Therefore, according to the monitoring device 20 in this exemplary embodiment, it is possible for the driver to view the area where the vehicle 80 is likely to contact an obstacle when backing up in a turn when the monitoring device 20 is in the path display mode, without requiring an operation by the driver. This also makes it possible to reduce the operation load on the driver while improving functionality as a device for monitoring the area around a vehicle.

According to the foregoing exemplary embodiment, the "image display unit" is realized by the controller 22 performing the processes in steps 104 and 106 in the routine shown in FIG. 12, and the processes in steps 120 and 122 in the routine shown in FIG. 15.

According to the foregoing exemplary embodiment, the side camera image from the side camera 54 is displayed on the display 60 when the vehicle 80 has reached the steering direction reversal point P when parallel parking. Then the corner camera image from the corner camera 56 is displayed on the display 60 when the vehicle angle δ of the vehicle 80 has reached the predetermined value δ1. Alternatively, however, the corner camera image from the corner camera 56 may start to be displayed without displaying the side camera image from the side camera 54 when the vehicle 80 has reached the steering direction reversal point P.

Also, according to the foregoing exemplary embodiment, the vehicle angle δ of the vehicle 80 is detected using the direction of the vehicle 80 when it has reached the steering direction reversal point P as a reference, and the corner camera image from the corner camera 56 is displayed on the display 60 when that vehicle angle δ has reached the predetermined value δ1. Then when the vehicle angle δ has reached the predetermined value δ2, that corner camera image stops being displayed. Alternatively, however, the vehicle angle δ of the vehicle 80 may be detected using the direction of the vehicle 80 when it is stopped in the parallel park start position parallel with the vehicle 90 parked in front as a reference.

According to the foregoing construction, the corner camera image from the corner camera 56 may be displayed on the display 60 when the vehicle angle δ has reached the predetermined value by first temporarily increasing and then decreasing after the vehicle 80 has reached the steering direction reversal point P, and that corner camera image may stop being displayed when the vehicle angle δ has reached the predetermined value by decreasing further. The corner camera image from the corner camera 56 may also be displayed on the display 60 at the point when the vehicle angle δ is near the value of the steering direction reversal point P, even before the vehicle 80 reaches the steering direction reversal point P.

Also, according to the foregoing exemplary embodiment, the corner camera image from the corner camera 56 starts to be displayed on the display 60 when the vehicle angle δ of the vehicle 80 has reached the predetermined value δ1 when parallel parking. However, the invention is not limited to this. For example, the corner camera image from the corner camera 56 may also start to be displayed on the display 60 when the steering angle θ has reached a predetermined value by turning the steering wheel in the reverse direction past the neutral position after the vehicle 80 has reached the steering direction reversal point P. The corner camera image from the corner camera 56 may also start to be displayed on the display 60 at the point when the actual position of the vehicle 80 is near the steering direction reversal point P along the target path of travel.

Moreover, according to the foregoing exemplary embodiment, the side camera image from the side camera 54 starts to be displayed on the display 60 when the vehicle angle δ of the vehicle 80 has reached the predetermined value δ11 when the vehicle is backing up in a turn when the monitoring device 20 is in the path display mode. The invention is not limited to this, however. For example, the side camera image may start to be displayed on the display 60 when simply the steering angle θ of the steering wheel has reached a predetermined value.

Also according to the foregoing exemplary embodiment, the switching of the display on the display 60 is performed when the monitoring device 20 is in the parallel parking guide mode, as well as when the monitoring device 20 is in the path display mode. Alternatively, however, switching of the display on the display 60 may also be performed when the vehicle 80 is backing up, irrespective of whether the monitoring device 20 is in either of those modes.

Further, according to the foregoing exemplary embodiment, the monitoring device 20 is used to assist the driver when parallel parking a vehicle, in which the rear wheels (RL and RR) are made the non-steered wheels and the front wheels (FL and FR) are made the steered wheels, to the rear. Alternatively, however, the monitoring device 20 may also be applied to assist the driver when parallel parking a vehicle, in which the front wheels FL and FR are made the non-steered wheels and the rear wheels RL and RR are made the steered wheels, to the front.

Furthermore, the exemplary embodiment is applied to a construction in which the side camera 54 and the corner camera 56 are both mounted on only the side opposite the driver's side, and images from those cameras are displayed on the display 60. Alternatively, however, a side camera and a corner camera may also be mounted on the side portion and the corner portion of the front portion of the vehicle body on the driver's side, and images from those cameras may be displayed on the display 60.

As described above, the embodiment of the invention provides a camera image of the area around the portion of the vehicle in which the likelihood of contact with an obstacle when parallel parking the vehicle increases. As a result, the driver can be provided with helpful information without requiring an operation by the driver.

Also, another embodiment of the invention provides a camera image of the area around the portion of the vehicle in which the likelihood of contact with an obstacle when backing up in a turn increases. As a result, the driver can be provided with helpful information without requiring an operation by the driver.

What is claimed is:

1. A device for monitoring an area around a vehicle having front wheels that serve as steered wheels, the device comprising an image display system that provides a back image of the vehicle to an operator of the vehicle during backing up, wherein the image display system switches from the back image of the vehicle to a side image of the vehicle on an outside of a turn in accordance with a state of the turn of the vehicle so as to provide the side image of the vehicle to the operator, the image display system provides an image of a side in front of the vehicle on a parking space side to the operator of the vehicle during parallel parking by backing up along a target path of travel to a parallel park complete position in a parking space when the front wheels move from a first state in which the front wheels are steered toward the parking space side, to a second state in which the front wheels are steered to a side opposite the parking space side during parallel parking of the vehicle, and it is determined that the front wheels move from the first state to the second state, on the basis of a result of comparing the target path of travel with a position of the vehicle.

2. The device according to claim 1, wherein the image display system starts providing the image of the side in front of the vehicle to the operator before the front wheels move from the first state to the second state.

3. The device according to claim 1, wherein the image display system starts providing the image of the side in front of the vehicle to the operator at a time when the vehicle moves to a predetermined position after the front wheels have moved from the first state to the second state.

4. The device according to claim 1, wherein the image display system provides one of a back image and a side image of the vehicle to the operator before starting provision of the image of the side in front of the vehicle on the parking space side.

5. The device according to claim 1, wherein the image display system provides at least one guidance image overlaid upon the back image of the vehicle to the operator so as to assist with the parallel parking.

6. The device according to claims 1, wherein the image display system continues providing the image of the side in front of the vehicle on the parking space side for a predetermined time period from start of provision of the image to the operator.

7. The device according to claim 6, wherein the image display system provides one of the back image and the side image of the vehicle to the operator after completion of provision of the image of the side in front of the vehicle on the parking space side to the operator.

8. The device according to claim 1, further comprising a controller that determines whether an angle of the vehicle relative to a starting position reaches a predetermined value, wherein the image display system switches the back image of the vehicle to a side image of the vehicle on an outside of turn when it is determined by the controller that the angle of the vehicle has reached the predetermined value during backing up so as to start providing the side image of the vehicle on the outside of turn to the operator.

9. The device according to claim 8, wherein the image display system starts providing the side image to the operator and continues providing the side image for a predetermined period of time.

10. The device according to claim 9, wherein the image display system switches the back image of the vehicle from the side image so as to be provided to the operator after completion of provision of the side image.

11. A method of monitoring an area around a vehicle having front wheels that serve as steered wheels, the method comprising the steps of:

provide a back image of the vehicle to an operator of the vehicle during backing up;

switching from the back image of the vehicle to a side image of the vehicle on an outside of a turn in accordance with a state of the turn of the vehicle so as to provide the side image of the vehicle to the operator; and providing an image of a side in front of the vehicle on a parking space side to the operator of the vehicle during parallel parking by backing up along a target path of travel to a parallel park complete position in a parking space when the front wheels move from a first state in which the front wheels are steered toward the parking space side, to a second state in which the front wheels are steered to a side opposite the parking space side during parallel parking of the vehicle, and it is determined that the front wheels move from the first state to the second state, on the basis of a result of comparing the target path of travel with a position of the vehicle.

12. The method according to claim 11, wherein provision of the image of the side in front of the vehicle to the operator is started to the operator before the front wheels move from the first state to the second state.

13. The method according to claim 11, wherein provision of the image of the side in front of the vehicle to the operator is started at a time when the vehicle moves to a predetermined position after the front wheels have moved from the first state to the second state.

14. The method according to claim 11, wherein one of the back image and the side image of the vehicle is provided to the operator before starting provision of the image of the side in front of the vehicle on the parking space side.

15. The method according to claim 11, wherein at least one of guiding lines is laid over the back image of the vehicle so as to be provided to the operator for assisting with the parallel parking.

16. The method according to claim 11, wherein provision of the image of the side in front of the vehicle on the parking space side is continued for a predetermined time period from start of provision of the image to the operator.

17. The method according to claim 16, wherein one of the back image and the side image of the vehicle is provided to the operator after completion of provision of the image of the side in front of the vehicle on the parking space side to the operator.

18. The method according to claim 11, further comprising the steps of:

determining whether an angle of the vehicle relative to a starting position reaches a predetermined value, switching the back image of the vehicle to a side image of the vehicle on an outside of turn when it is determined that the angle of the vehicle has reached the predetermined value during backing up so as to start providing the side image of the vehicle on the outside of turn to the operator.

19. The method according to claim 18, wherein the side image is provided to the operator and provision of the side image is continued for a predetermined period of time.

20. The method according to claim 18, wherein the back image of the vehicle is switched from the side image so as to be provided to the operator after completion of provision of the side image.

* * * * *